US012651077B2

(12) United States Patent
Tembey et al.

(10) Patent No.: US 12,651,077 B2
(45) Date of Patent: Jun. 9, 2026

(54) AUTOMATICALLY DETECTING MULTI-LAYER TOXIC COMBINATIONS OF APPLICATION SECURITY RISKS IN CLOUD ENVIRONMENTS

(71) Applicant: Operant AI, Inc., San Francisco, CA (US)

(72) Inventors: Priyanka Mohan Tembey, San Francisco, CA (US); Glenn McDonald, Guelph (CA); Rotem Wolfovich, New York, NY (US); Vrajesh Rajesh Bhavsar, San Francisco, CA (US); Ashley Michelle Chapman Roof, San Francisco, CA (US)

(73) Assignee: Operant AI, Inc., San Francisco, CA (US)

( * ) Notice: Subject to any disclaimer, the term of this patent is extended or adjusted under 35 U.S.C. 154(b) by 38 days.

(21) Appl. No.: 18/901,870

(22) Filed: Sep. 30, 2024

(65) Prior Publication Data

US 2026/0093818 A1 Apr. 2, 2026

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 12,461,987 B1 * | 11/2025 | Torbett | G06F 16/986 |
| 2018/0314984 A1 * | 11/2018 | Wiener | G09B 19/18 |
| 2018/0324204 A1 | 11/2018 | McClory et al. | |
| 2018/0375880 A1 * | 12/2018 | Dakshinamoorthy | H04L 63/1416 |
| 2020/0272741 A1 * | 8/2020 | Bhatia | G06F 40/284 |

(Continued)

OTHER PUBLICATIONS

Sukru Cankaya, Extended European Search Report for EPO Patent Application No. 25205699.9 mailed Feb. 6, 2026, 12 pages, European Patent Office, Munich, Germany.

*Primary Examiner* — Trang T Doan
(74) *Attorney, Agent, or Firm* — Baker Botts L.L.P.

(57) ABSTRACT

In an embodiment, one or more non-transitory computer-readable media storing sequences of instructions which, when executed using processors, cause the processors to execute, using a runtime security engine deployed within a computing environment: obtaining telemetry data comprising security-related data from microservices executing in the computing environment; accessing risk categories codifying insecure behavior across multiple layers in the computing environment; accessing toxic combination patterns across the layers, the toxic combination patterns being generated based on the risk categories, and each of the toxic combination pattern indicating a high-severity security impact in case of an attack in the computing environment; evaluating the telemetry data against the risk categories and toxic combination patterns, the evaluating producing a customized set of toxic combination patterns specific to the application within the computing environment; and displaying the customized set of toxic combination patterns in real time in a graphical user interface of a computer display device.

34 Claims, 6 Drawing Sheets

(56) References Cited

U.S. PATENT DOCUMENTS

| | | |
|---|---|---|
| 2021/0168150 A1 | 6/2021 | Ross et al. |
| 2021/0294901 A1 | 9/2021 | Agarwwal |
| 2022/0092180 A1* | 3/2022 | Richardson .......... G06F 11/108 |
| 2022/0156383 A1* | 5/2022 | Schwarzbauer ...... G06F 21/566 |
| 2023/0100322 A1 | 3/2023 | Mengwasser |
| 2023/0109926 A1 | 4/2023 | Nair et al. |
| 2024/0205259 A1 | 6/2024 | Tembey et al. |
| 2024/0291831 A1 | 8/2024 | Tembey et al. |
| 2024/0430234 A1* | 12/2024 | Estevez Polo ...... H04L 63/0263 |
| 2025/0097709 A1* | 3/2025 | Balmakhtar .......... G06N 10/60 |

* cited by examiner

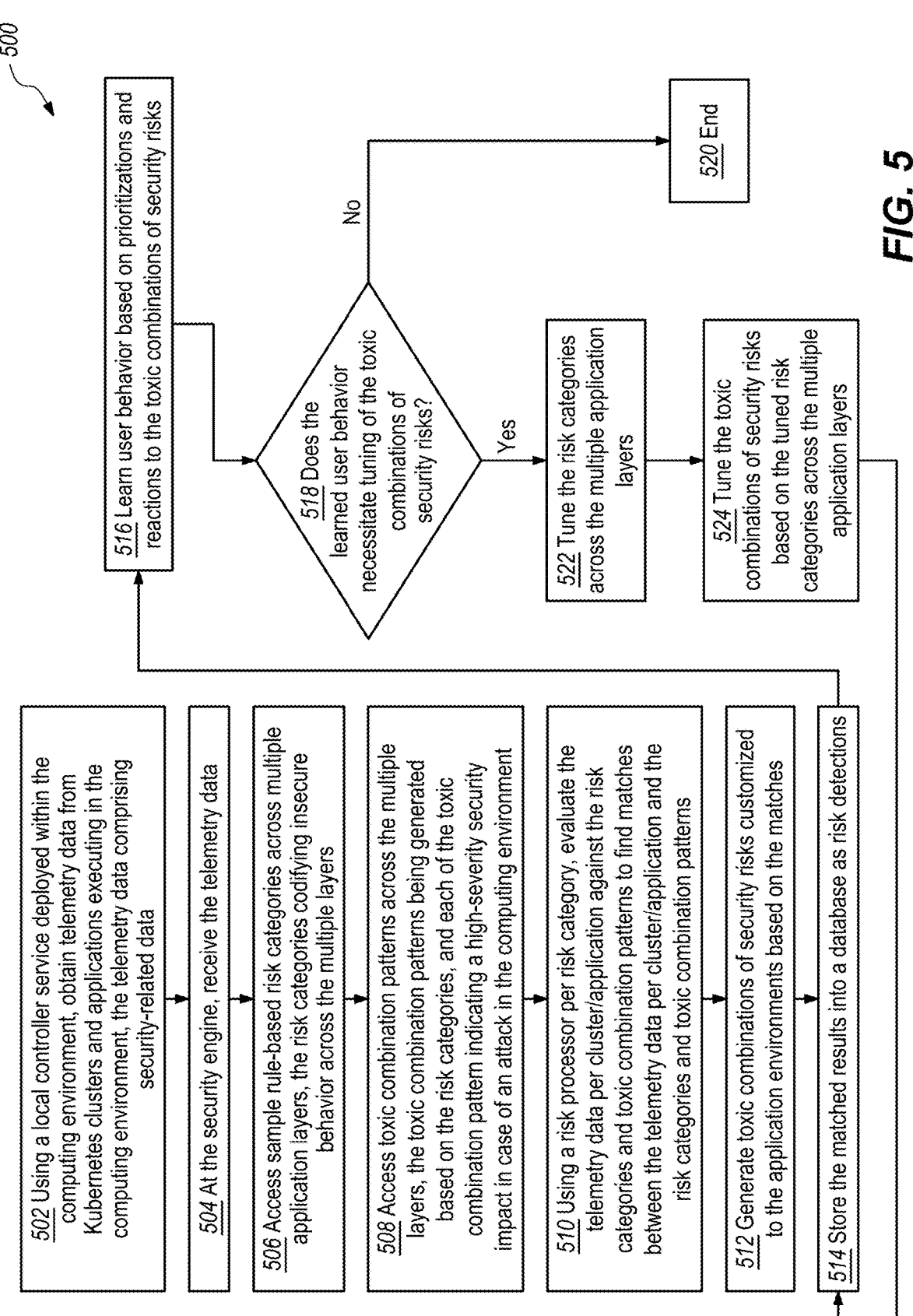

*500*

*502* Using a local controller service deployed within the computing environment, obtain telemetry data from Kubernetes clusters and applications executing in the computing environment, the telemetry data comprising security-related data

*504* At the security engine, receive the telemetry data

*506* Access sample rule-based risk categories across multiple application layers, the risk categories codifying insecure behavior across the multiple layers

*508* Access toxic combination patterns across the multiple layers, the toxic combination patterns being generated based on the risk categories, and each of the toxic combination pattern indicating a high-severity security impact in case of an attack in the computing environment

*510* Using a risk processor per risk category, evaluate the telemetry data per cluster/application against the risk categories and toxic combination patterns to find matches between the telemetry data per cluster/application and the risk categories and toxic combination patterns

*512* Generate toxic combinations of security risks customized to the application environments based on the matches

*514* Store the matched results into a database as risk detections

*516* Learn user behavior based on prioritizations and reactions to the toxic combinations of security risks

*518* Does the learned user behavior necessitate tuning of the toxic combinations of security risks?

No → *520* End

Yes

*522* Tune the risk categories across the multiple application layers

*524* Tune the toxic combinations of security risks based on the tuned risk categories across the multiple application layers

*FIG. 5*

AUTOMATICALLY DETECTING MULTI-LAYER TOXIC COMBINATIONS OF APPLICATION SECURITY RISKS IN CLOUD ENVIRONMENTS

COPYRIGHT NOTICE

TECHNICAL FIELD

One technical field of the present disclosure is computer-implemented network management methods, security engineering, and security management. Another technical field is cloud computing.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by their inclusion in this section.

Security engineering is the technical field of understanding networked resources and topologies, determining potential attack vectors, and hardening distributed systems against improper or unauthorized access. As networks of distributed computing resources become larger and more complex, network administrators, IT teams, and security analysts can lose the ability to efficiently determine what endpoints, APIs, and other networked resources have connectivity or are exposed to contact from external clients or attackers. Effective security engineering often requires developing visualizations or datasets describing distributed systems that can be explored and inspected to identify attack vectors.

In some past approaches, security engineers have sought to assess the runtime behavior of a distributed system based on inspecting server log files to determine which applications within an enterprise have called which external APIs and how internal application APIs served external programmatic calls of clients. Log-based approaches generally need offline, potentially manual processing, which is incapable of producing a real-time view of the behavior of an application. With high network traffic volume and highly dynamic microservice-based apps, log-based approaches cannot scale to keep pace with today's complex networks. Furthermore, supporting a log-based approach requires instrumenting the data collection targets with instructions to output useful log records. Coding instrumentation involves heavy manual work. Therefore, security engineers need better ways to identify application traffic and the incoming and outgoing application connections in real-time for all microservices associated with an application.

Additionally, the scale of user and machine identities in today's cloud-native software stacks continues to increase. Relevant data include identities and roles of users who access an application or resource, API keys, certificates for devices that may have access to an API, API identifiers, internal developer accounts, service accounts that access internal cloud services and third-party APIs, and more.

Consequently, tracking who is accessing a resource or API and defining access policies can no longer be defined in terms of IP addresses alone, as with older, firewall-based approaches. Also, identity access policies can no longer be simply network-based; they must account for APIs, data, and applications.

Finally, today's cloud-native applications are not always deployed in controlled environments; they may run in third-party cloud infrastructure and in infrastructure layers such as containerization platforms. The security of a modern cloud-native application needs to encompass the application layer, the API layer, the container, virtual machines, and other cloud infrastructure. However, contemporary security engineering tools do not comprehensively address all logical layers of today's application deployments.

SUMMARY

The appended claims may serve as a summary of the invention.

BRIEF DESCRIPTION OF THE DRAWINGS

In the drawings:

FIG. 5 illustrates an example process flow of a programmable method to generate toxic combinations of security risks customized to application environments using an embodiment.

DETAILED DESCRIPTION

Figure 1:
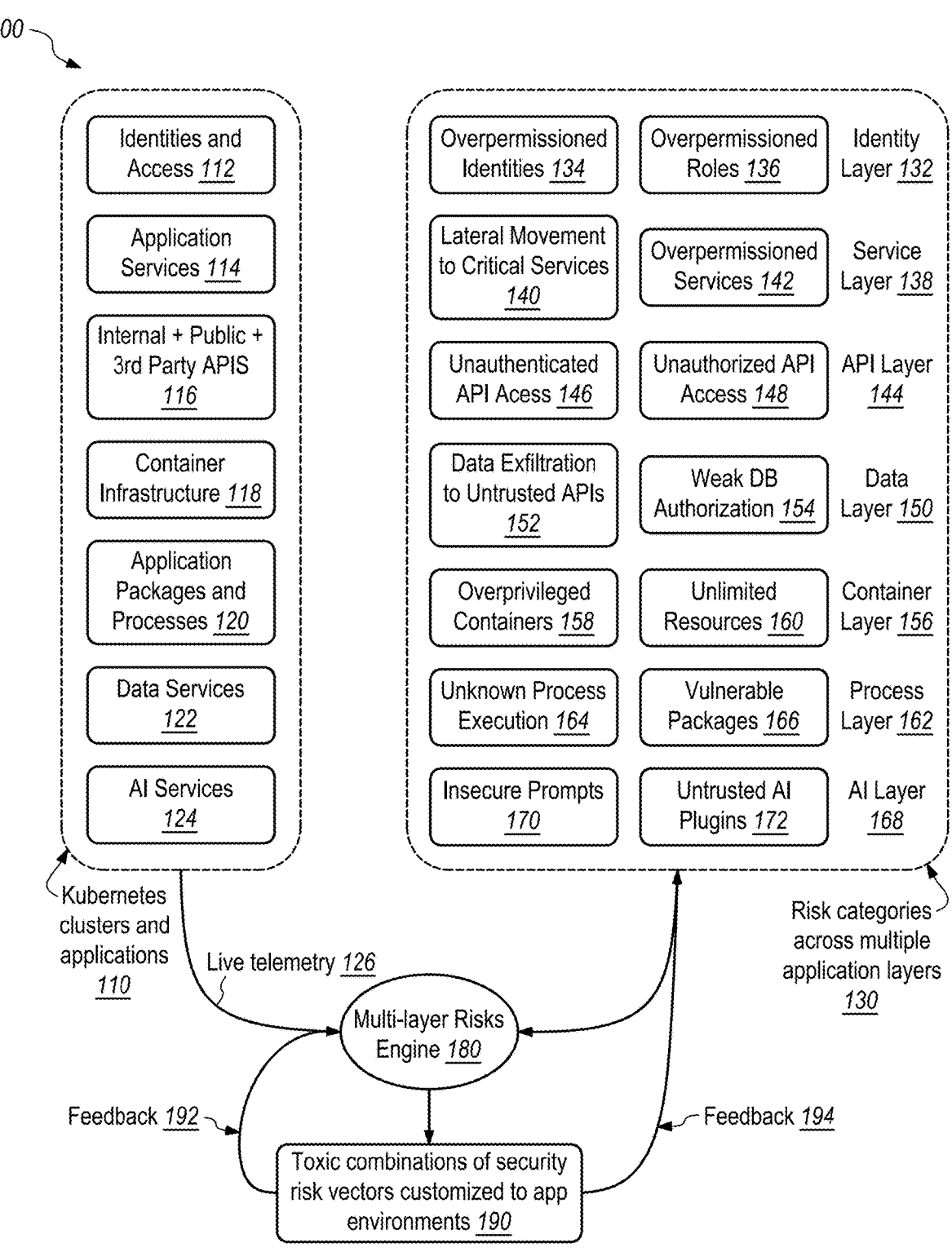
FIG. 1 illustrates a distributed computer system showing the context of use and principal functional elements with which one embodiment could be implemented.

In the following description, for the purposes of explanation, numerous specific details are set forth to provide a thorough understanding of the present invention. It will be apparent, however, that the present invention may be practiced without these specific details. In other instances, well-known structures and devices are shown in block diagram form to avoid unnecessarily obscuring the present invention.

The text of this disclosure, in combination with the drawing figures, is intended to state in prose the algorithms that are necessary to program the computer to implement the claimed inventions at the same level of detail that is used by people of skill in the arts to which this disclosure pertains to communicate with one another concerning functions to be programmed, inputs, transformations, outputs and other aspects of programming. That is, the level of detail outlined in this disclosure is the same level of detail that persons of skill in the art normally use to communicate with one another to express algorithms to be programmed or the structure and function of programs to implement the inventions claimed herein.

One or more different inventions may be described in this disclosure, with alternative embodiments to illustrate examples. Other embodiments may be utilized, and structural, logical, software, electrical, and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more of the inventions nor a listing of features of one or more of the inventions that must be present in all embodiments.

Headings of sections and the title are provided for convenience but are not intended to limit the disclosure in any way or as a basis for interpreting the claims. Devices that are described as in communication with each other need not be in continuous communication with each other unless expressly specified otherwise. In addition, devices that are in communication with each other may communicate directly or indirectly through one or more intermediaries, logical or physical.

A description of an embodiment with several components in communication with one other does not imply that all such components are required. Optional components may be described to illustrate a variety of possible embodiments and to fully illustrate one or more aspects of the inventions. Similarly, although process steps, method steps, algorithms, or the like may be described in sequential order, such processes, methods, and algorithms may generally be configured to work in different orders unless specifically stated to the contrary. Any sequence or order of steps described in this disclosure is not a required sequence or order. The steps of the described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment but need not occur only once. Some steps may be omitted in some embodiments or some occurrences, or some steps may be executed more than once in a given embodiment or occurrence. When a single device or article is described, more than one device or article may be used in place of a single device or article. Where more than one device or article is described, a single device or article may be used in place of more than one device or article.

The functionality or features of a device may be alternatively embodied by one or more other devices that are not explicitly described as having such functionality or features. Thus, other embodiments of one or more of the inventions need not include the device itself. Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code that include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

1. General Overview

Modern cloud applications comprise multi-layer distributed systems with many cascading dependencies, causing the security risks to be intertwined in a network of blind spots. A risk in one part of an application that the security team is unaware of could become the weakest link, leading to a critical data breach or system takeover. Due to the nature of today's highly connected application architectures and, in particular, reliance on third-party platforms, APIs, and services, it is not just important to understand security risks at each individual application layer, but teams need to understand the inherent dependencies that their applications have, what are the risks at layer, and how they are correlated to have insight into end-to-end risks that impact critical assets and data. While building such a holistic understanding of security risk customized to each application environment has become imminent due to the changing nature of modern applications, it is also an important tool when it comes to prioritizing risks to identify and mitigate the highest severity ones first.

The present disclosure addresses the issue of identifying application security risks in cloud networks. In certain embodiments, a cloud-native runtime application protection platform can provide full-stack application security insights and enforcements. A runtime security engine can generate a holistic view of live telemetry and security risk context across all the layers of applications, from processes and container layers to their identities and API layers. In doing so, the cloud-native runtime application protection platform can enable security teams to gain an end-to-end, complete understanding of the cloud applications. In this context, "cloud-native" can mean that a distributed computing system programmed to execute application protection functions is inherently capable of identifying application security risks that are specific to cloud-based networks. Prior approaches may not be programmed to recognize the security risks unique to cloud-based networks.

In one embodiment, the disclosure provides a full-stack Kubernetes security monitoring, detection, and recommendation service. An embodiment can be programmed to inspect application traffic, based on live telemetry from microservices rather than static log files, from OSI logical network Layer 7+ down to service, container, and identity layers. Embodiments recognize that security vulnerabilities can exist across each layer. Embodiments are programmed to correlate vulnerabilities across layers to identify toxic combinations or attack vectors that combine issues in multiple layers, customize data collection, and evaluate toxic combinations in the particular application environment. The configuration of an embodiment can be further customized based on a customer-specific application computing environment, based on what services or data flows a particular enterprise considers sensitive or critical. Embodiments are programmed to prioritize cross-layer security vulnerabilities and identify risks arising from combinations of vulnerabilities in different layers, whereas prior approaches cannot combine risks across layers to define the highest-risk paths across OSI layers. Embodiments can also be programmed to use data from a community of unrelated enterprises by recognizing a toxic pattern associated with one enterprise and updating toxic pattern data to enable detecting a similar pattern in the computing environment of an unrelated enterprise.

In an embodiment, the disclosure provides one or more non-transitory computer-readable media storing one or more sequences of instructions which, when executed using one or more processors, cause the one or more processors to execute, using a runtime security engine deployed within a computing environment: obtaining, from a local controller service deployed within the computing environment, telemetry data from microservices executing in the computing environment, and the telemetry data comprising security-related data; accessing a plurality of risk categories codifying insecure behavior across a plurality of layers in the computing environment; accessing a plurality of toxic combination patterns across the plurality of layers, the plurality of toxic combination patterns being generated based on the plurality of risk categories, and each of the toxic combination pattern indicating a high-severity security impact in case of an attack in the computing environment; evaluating the telemetry data against the plurality of risk categories and the plurality of toxic combination patterns, the evaluating producing a customized set of toxic combination patterns specific to the application within the computing environment; and displaying the customized set of toxic combination patterns in real time in a graphical user interface of a computer display device.

In some embodiments, the plurality of layers comprises an identity layer. The plurality of risk categories for the identity layer comprises one or more over-permission identities or over-permission roles.

In some embodiments, the plurality of layers comprises a service layer. The plurality of risk categories for the service layer comprises one or more lateral movements to critical services or over-permission services.

In some embodiments, the plurality of layers comprises an application programming interface (API) layer. The plurality of risk categories for the API layer comprises one or more unauthenticated API access or unauthorized API access.

In some embodiments, the plurality of layers comprises a data layer. The plurality of risk categories for the data layer comprise one or more of data exfiltration to untrusted application programming interfaces (APIs) or weak database authorization.

In some embodiments, the plurality of layers comprises a container layer. The plurality of risk categories for the container layer comprises one or more over-privileged containers or unlimited resources.

In some embodiments, the plurality of layers comprises a process layer. The plurality of risk categories for the process layer comprises one or more unknown process executions or vulnerable packages.

In some embodiments, the plurality of layers comprises an artificial intelligence (AI) layer. The plurality of risk categories for the AI layer comprises one or more insecure prompts or untrusted AI plugins.

In some embodiments, each of the toxic combination patterns correlates two or more risk categories across two or more layers of the plurality of layers.

In some embodiments, evaluating the telemetry data against the plurality of risk categories and the plurality of toxic combination patterns comprises using a rule processor to compare the telemetry data with each of the risk categories and each of the toxic combination patterns, comparing producing one or more matched results; and storing the one or more matched results in a database as risk detections.

In some embodiments, evaluating the telemetry data against the plurality of risk categories and the plurality of toxic combination patterns is based on a set frequency.

In some embodiments, the computer-readable media further comprises sequence of instructions which when executed by the one or more processors cause: determining user preferences on prioritizing one or more toxic combination patterns of the customized set of toxic combination patterns, updating one or more risk categories of the plurality of risk categories based on the user preferences, and updating the customized set of toxic combination patterns based on the user preferences.

In some embodiments, the computer-readable media further comprises sequence of instructions which when executed by the one or more processors cause: detecting, based on the telemetry data, one or more risk features associated with an application associated with the microservices; updating one or more risk categories of the plurality of risk categories based on the one or more risk features; and updating the customized set of toxic combination patterns based on the one or more risk features.

In some embodiments, the telemetry data includes at least one of: a request source namespace, a request destination namespace, a request application programming interface (API) endpoint, a request API method, a request authentication header, or identifying information about entities accessing any one of the microservices.

In some embodiments, the security-related data includes at least one of: a number of application programming interface (API) requests that are unauthenticated, security-related vulnerabilities within containers and virtual machines hosting the microservices, or security-related gaps in data storage with which the microservices interact.

In some embodiments, the local controller service comprises a plurality of sidecar processes, each sidecar process among the plurality of sidecar processes being generated for and corresponding to each microservice among the microservices, wherein each sidecar process among the plurality of sidecar processes is configured to have access to data flowing in and out of a corresponding microservice of the microservices.

In some embodiments, the local controller service comprises an application container that a container platform application programming interface (API) brings up in the computing environment. The local controller service is further configured to query a metadata service of the container platform API to obtain additional security-related data, including whether data stored in a database accessed by a microservice is encrypted, whether a connection to a data service is encrypted, and how open is an access to a specific data resource based on its network configuration.

In some embodiments, the local controller service is programmed to automatically detect a known open port of a microservice from the microservices and output associated telemetry data based on a protocol associated with the open port.

2. Structural & Functional Overview

2.1 Example Distributed Computer System Implementation

FIG. 1 illustrates a distributed computer system showing the context of use and principal functional elements with which one embodiment could be implemented. In an embodiment, a computer system of an embodiment of FIG. 1 comprises components that are implemented at least partially by hardware at one or more computing devices, such as one or more hardware processors executing stored program instructions stored in one or more memories for performing the functions that are described herein. In other words, all functions described herein are intended to indicate operations performed using programming in a special or general-purpose computer in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose, and claim a technical system and technical methods in which specially programmed computers, using a special-purpose distributed computer system design, execute functions that have not been available before to provide a practical application of computing technology to the problem of multi-layer security engineering for cloud-native applications. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

In an embodiment, a distributed computer system 100 may include a plurality of Kubernetes clusters and applications 110, collectively comprising one or more software applications executing in one or more containers, as well as container infrastructure and services to support the operation of the containers and the applications. For example, Kubernetes clusters and applications 110 may include an application for processing identities and access 112, application services 114, internal, public, and third-party APIs 116, container infrastructure 118, other application packages and processes 120, data services 122, and AI services 124.

As further described in other sections, each of the functional units of Kubernetes clusters and applications 110 continuously generates, during execution and operation, live telemetry 126 that a multi-layer risks engine 180 or security engine can consume. In an embodiment, the multi-layer risks engine 180 is programmed to obtain, in real-time as applications execute, the live telemetry 126 from the Kubernetes clusters and applications 110. Telemetry comprises digital data expressing application state, load, functions, and/or programmatic requests.

The multi-layer risks engine 180 is programmed, in one embodiment, to digitally store data derived from the live telemetry in one or more risk categories 130. Each data item derived from the live telemetry 126 and categorized in one of the risk categories 130 corresponds to a program, configuration, network, or security risk or vulnerability or an application, service, or element of the infrastructure of the Kubernetes clusters and applications 110.

Furthermore, unlike prior approaches, in an embodiment, the multi-layer risks engine 180 is programmed to associate two or more individual risk categories 130 with a distinct logical layer that applications or infrastructure use or interact with. In one embodiment, the application layers associated with the risk categories 130 can comprise an identity layer 132, a service layer 138, an API layer 144, a data layer 150, a container layer 156, a process layer 162, and an AI layer 168. All data items stored as part of the risk categories 130 and data identifying the layers can be digitally stored in structured, persistent storage, such as in tables of a relational database system, an in-memory graph, or other data structures. Different embodiments may use different identifications of the layers, and the specific layers 132, 138, 144, 150, 156, 162, 168 represent only one possible combination of layer definitions. The identity and use of risk categories 130 are described in further detail in other sections.

In an embodiment, the multi-layer risk engine 180 is programmed to determine or generate, based on the data items stored in the risk categories 130 across layers 132, 138, 144, 150, 156, 162, 168, one or more toxic combinations 190 of security risk vectors customized to app environments. "Toxic," in this context, can mean that application layers and dependencies could have a high-severity security impact, such as data breaches or system takedown in the case of a crypto mining attack vector. In an embodiment, the multi-layer risk engine 180 is programmed to store data representing one or more toxic combinations of security risk vectors in the database schema or other data structures in memory or persistent digital data storage.

In various embodiments, the multi-layer risk engine 180 is programmed to generate, receive, or forward feedback 192, 194 responsive to the toxic combinations 190 of security risk vectors customized to application environments. The feedback can be based on risks prioritized across application environments. In one embodiment, the feedback 192 may be fed back into the multi-layer risks engine 180. The feedback 194 may be fed back into the risk categories 130 across multiple application layers to update the risk categories. Based on feedback 192 and updated risk categories, the multi-layer risks engine 180 is programmed to tune the toxic combinations 190 of security risk vectors customized to app environments.

2.2 Multi-Layer Live Application Telemetry Collection

In certain embodiments, the multi-layer risks engine 180 is programmed to ingest the live telemetry 126 from different layers of the application stack to build a graph-based view of the Operating System (OS)-level processes and packages make up an application, the network endpoints at which the application service is exposed to other services, contextual information such as whether the application is a public-facing service, or internal service, or service that talks to external services such as databases or third-party APIs, container and host infrastructure hosting the application, API endpoints that the application serves and depends on, and the machine identities and roles that the application uses to act in its environment. The graph-based view can be rendered based on a digitally stored runtime application security graph representing attributes relating to runtime security and risk context in each layer of a cloud-native application. The runtime application security graph can comprise a dynamic map of the application stack displayed in real-time as the multi-layer risks engine 180 receives the live telemetry 126, updates the risk categories 130, determines toxic combinations 190, and generates feedback 192, 194. In one embodiment, the runtime application security graph in a graphical user interface can show:

1. API traffic flows across multiple application layers from the public-facing API endpoint layer to internal microservices, external third-party APIs, and a data store layer.
2. External and internal user identities such as usernames or emails, service identities like API keys and device certificates, and roles, and how they access various API and data resources and through which microservices.
3. Data flows that originate within internal microservices of an application environment but eventually exit the environment to third-party APIs, external IP addresses, services, or external data stores.

4. Security vulnerabilities within each application layer, such as unauthenticated API endpoints allowing open access to a service's APIs, a container image having a critical CVE vulnerability, or an external data store that is misconfigured with suboptimal security parameters.

In an embodiment, the multi-layer risks engine 180 is programmed using graph analytics to update the dynamic map to show potential attack vectors into applications by triangulating risks across multiple layers, including identities, API accesses, and data stores and vulnerabilities, to show what assets are at critical risk, how they can be breached in a potential attack, and what can be done to protect those assets.

Embodiments improve over past approaches in many ways. For example, embodiments are driven by the live telemetry 126, received in real-time as the multi-layer risks engine 180 executes. Rather than depending upon analysis of stored logs and instrumenting applications to generate log entries, embodiments use the live telemetry 126 to intercept application traffic at runtime and deduce an application's incoming and outgoing connections in real-time, including for all microservices within an application. In an embodiment, the multi-layer risks engine 180 is programmed to construct the runtime application security graph in real-time without manual, offline processing. Embodiments produce a more complete and accurate representation of the runtime application security graph using these automated, zero-instrumentation techniques to source the data needed to create the runtime application security graph. In contrast, manual log-based approaches are inconsistently applied across microservices and may not capture all aspects of an application's traffic behavior reliably.

Embodiments are also identity-aware, based on the configuration of contemporary cloud-native apps, creating the runtime application security graph that represents and provides visibility into what application layer resources identities access, including but not limited to APIs, data, services, or other resources and not just IP addresses.

Furthermore, embodiments can collect and correlate data across every layer of the modern cloud-native application to recommend steps to secure it end-to-end. Embodiments can graph elements of third-party cloud infrastructure and indicate the use of containerized platforms like Kubernetes. Therefore, security engineering for a modern cloud-native application can encompass applications, APIs, containers, virtual machines, and other infrastructure, as well as data and other external services that the application interacts with and depends on.

Figure 2:
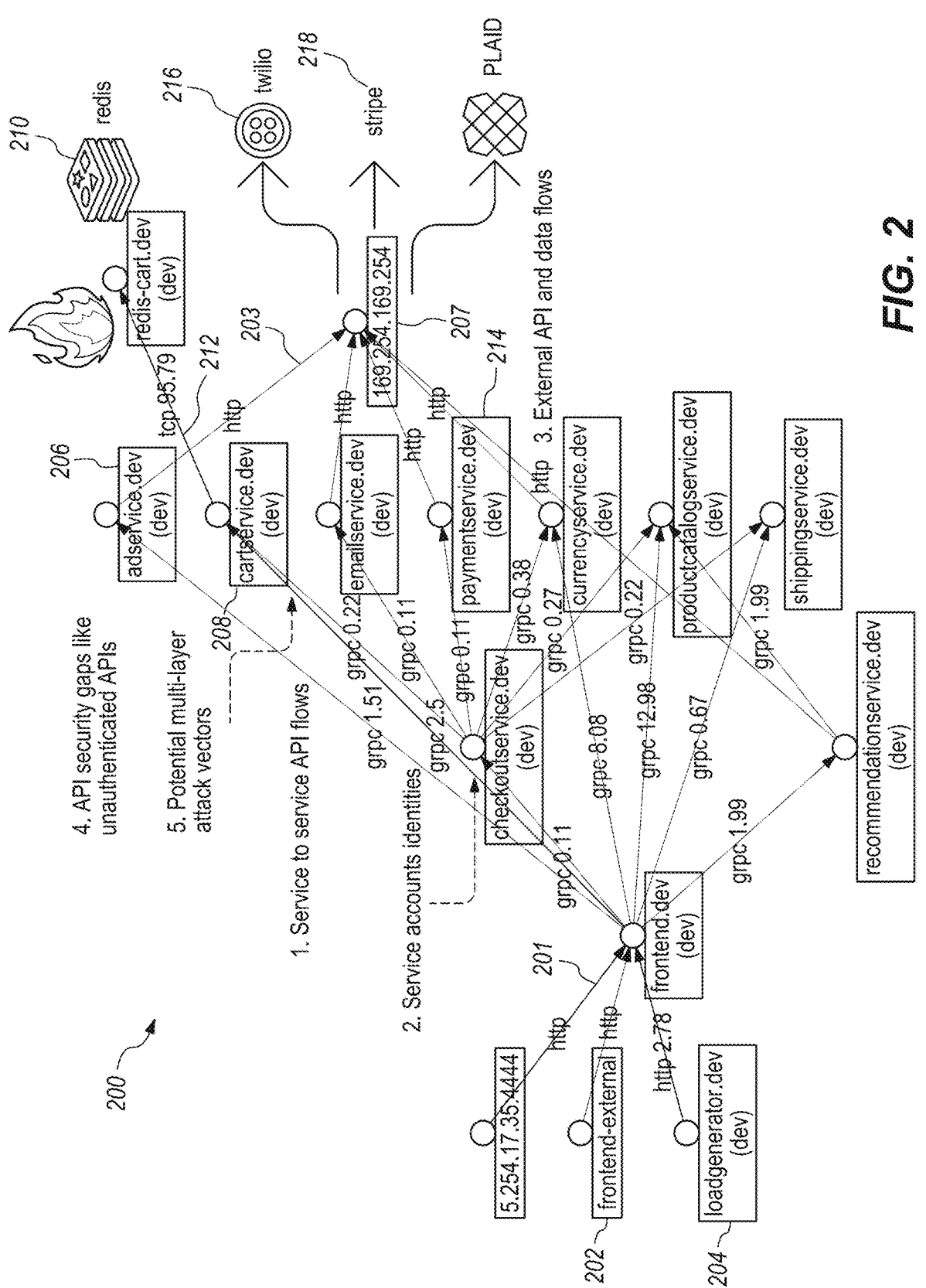
FIG. 2 illustrates an example computer display device with a graphical user interface showing a runtime application security graph that has been generated according to an embodiment.

FIG. 2 illustrates an example computer display device with a graphical user interface showing a runtime application security graph that has been generated according to an embodiment. In an embodiment, the multi-layer risks engine 180 is programmed to discover microservice interactions dynamically and to display a visual representation of the microservice interactions as a runtime application security graph 200. In the example of FIG. 2, a plurality of nodes 202, 204, 206, 208 represent microservices. As reference numeral (1.) indicates, the arrows 201, 203, 212, and others represent logical service-to-service API flows. Data representing flows to render the arrows can be created and stored based on the programmatic calls or access requests the microservices can make based on the live telemetry 126 that the multi-layer risks engine 180 has observed and analyzed. The multi-layer risks engine 180 also can be programmed to capture and store, from application API calls or requests, protocol values specifying protocols such as "http," "grpc,"

"tcp," and others, which can be rendered in the runtime application security graph 200 in association with the arrows.

As reference numeral (2.) indicates, each node 202, 204, 206, 208 may have an identity value corresponding to the service identity value used in the application environment, such as "frontend-external," "loadgenerator.dev," "adservice.dev," "cartservice.dev," and others. As reference numeral (3.) indicates, the runtime application security graph 200 also can comprise arrows that visually represent calls to external applications or external data flows representing security risks. For example, the "adservice.dev" node 206 can call, via a gateway 207 having the IP address "169.254.169.254," a Redis data cache 210 and/or external, third-party APIs like Twilio 216 or Stripe 218.

As the reference numeral (4.) indicates, in an embodiment, the multi-layer risks engine 180 is programmed to identify API security gaps, like unauthenticated APIs, as well as potential multi-layer attack vectors (reference numeral 5.). As an example of a multi-layer attack vector, the multi-layer risks engine can correlate risks across multiple layers of a microservice such as a payment service. The payment service may have vulnerabilities in its container runtime combined with unauthenticated APIs that then communicate with third party services, which increases the overall risk of data exfiltration or leakage from a critical service such as payments.

In an embodiment, graph analytics methods are programmed to process data describing the microservice interactions and to recommend micro-segmentation policies. An example recommendation could be that the "cartservice" microservice of node 208 can communicate with the Redis data cache 210 as indicated by arrow 212, but all other services of nodes 202, 204, 206 cannot communicate with the cache. In this manner, embodiments would reduce the attack surface for potential lateral movement attacks through other services to reach critical data stored within the Redis data cache 210.

Similarly, an embodiment might recommend that only the payment service microservice of node 214 can communicate with external, third-party APIs like Twilio 216 or Stripe 218, while the "cartservice" microservice of node 208 cannot. A recommendation of that type would reduce the movement of sensitive data, such as payment information, to only those services that need to process it at runtime.

Embodiments are programmed to generate micro-segmentation policies based on runtime application identity values, not IP addresses. In this context, a runtime identity is defined at the application layer and includes certificate identifiers of service accounts, API keys, user email addresses, and service account roles or user roles. Expressing policies using runtime application identities enables effective interoperation with cloud-native stacks because IP addresses and ports are ephemeral entities. For example, in Kubernetes stacks, IP addresses that have been provisioned for application pods keep changing as the pods get replaced, thereby rendering micro-segmentation rules defined in terms of IP addresses meaningless over time. FIG. 2 shows how an embodiment can define microsegments using service identities. As one example, the Kubernetes service account identity ("cartservice.dev") corresponding to the "cartservice" microservice of node 2087 can communicate with the Redis cache 210, and no other identity may communicate with the Redis cache. In this context, service identities can comprise the common names within certificates that have been provisioned for service accounts.

In an embodiment, the multi-layer risks engine 180 is programmed based on a zero-trust model. Formerly, firewall implementations could be based on perimeter security, in which all untrusted devices or applications are outside the firewall perimeter while elements needing protection from untrustworthy actors are inside the firewalled domain. For today's cloud-native application stacks, perimeter security is non-existent because applications are no longer deployed in controlled private networks. Instead, applications are deployed in public cloud networks, leaving open attack surfaces both external and internal to the applications. For cloud-native application stacks, embodiments apply zero trust to all programmatic messages, requests, or other communication, and the identity of an application must always be verified using cryptographically sound authentication mechanisms. Furthermore, in an embodiment, micro-segmentation policies enforce zero trust for all service communications. Therefore, rather than checking for IP addresses or subnet identifiers that can easily be spoofed, in an embodiment, the multi-layer risks engine 180 is programmed to use stronger forms of secure identifiers, such as TLS certificate common names or authenticated JSON Web Token (JWT) claims to determine whether a service can communicate with another service. Implementing a zero-trust model helps establish stronger guarantees for more secure communication between microservices.

In an embodiment, the multi-layer risks engine 180 is programmed based on Layer 7+ APIs and data flows. Since almost all microservice interactions are based on Layer 7 protocols, micro-segmentation policies in embodiments express policies to allow or deny programmatic traffic using Layer 7 semantics. For example, a policy may specify that a payment service can communicate with specified external third-party payment processing APIs and notification services like Stripe 218 and Twilio 216. By moving beyond coarser micro-segmentation rules based on IP subnets, the micro-segmentation rules of embodiments allow for fine-grained, custom, application-centric policies depending on the application layer protocol while minimizing opportunities for lateral attack.

Figure 3:
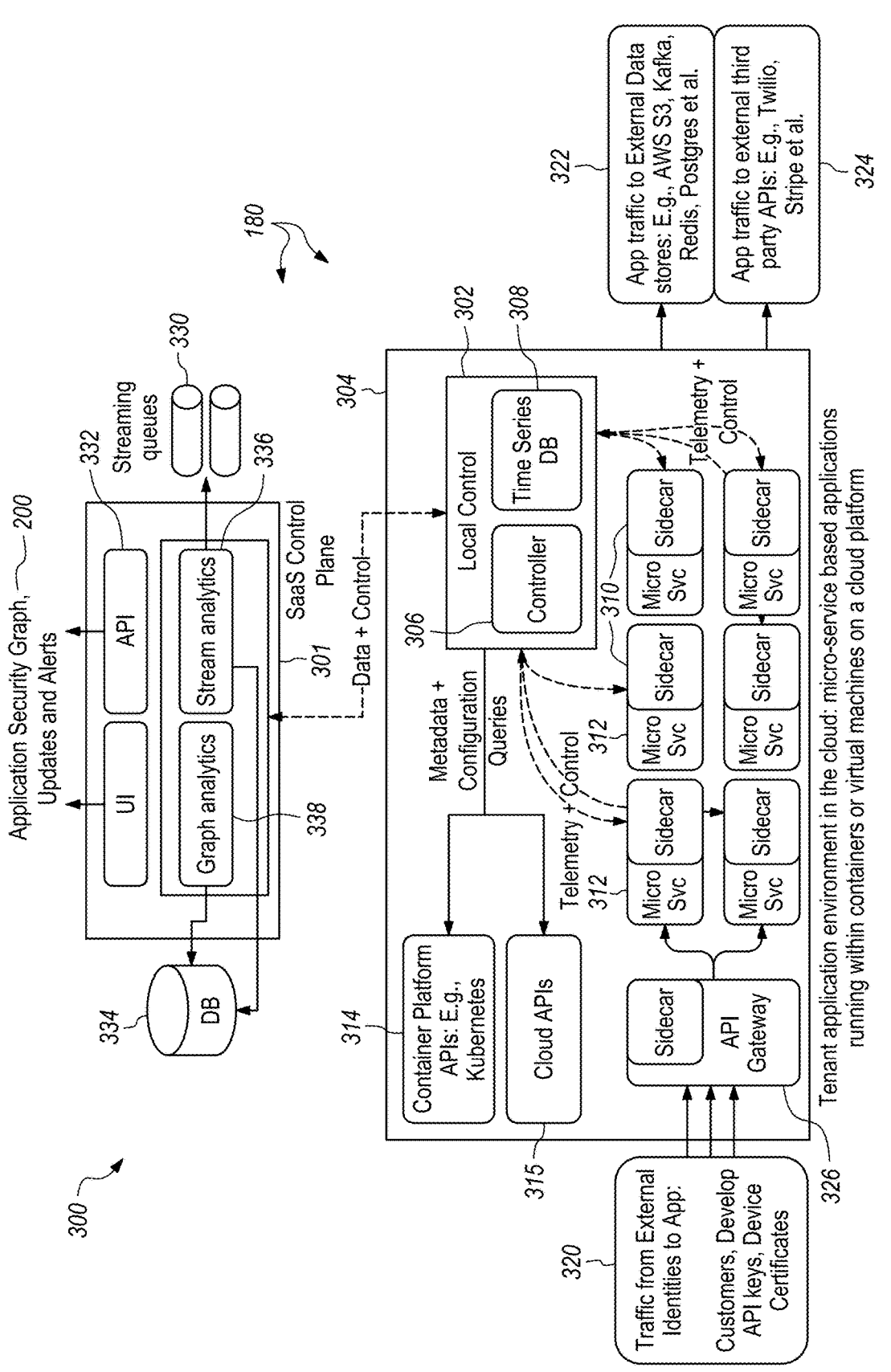
FIG. 3 illustrates an example software architecture configured and programmed to provide automatic, identity-based application-layer micro-segmentation recommendations for cloud-native applications based on runtime application traffic telemetry.

FIG. 3 illustrates an example software architecture configured and programmed to provide automatic, identity-based application-layer micro-segmentation recommendations for cloud-native applications based on runtime application traffic telemetry. In one embodiment, a software architecture 300 comprises the following functional elements. Unless stated otherwise, each of the functional elements can comprise one or more sequences of stored program instructions and/or one or more non-transitory computer-readable storage media storing one or more sequences of instructions which, when executed using one or more processors, cause the one or more processors to execute the functions that are described. Consistent with contemporary professional means of software distribution, an embodiment can implement one or more functional elements as libraries, executables, modules, or units of code that are downloaded, installed, or linked to other software, virtual compute elements, and/or virtual storage elements. The mechanics of distribution, deployment, installation, and instantiation are not critical and are considered within the high level of skill in the art to which this disclosure is directed.

Application Environment: In one embodiment, functional elements are deployed in a cloud-based tenant or customer environment or application environment 304 comprising a plurality of microservice-based applications running within containers or virtual machines in a private data center, public data center, or cloud computing environment. In an embodiment, the application environment 304 comprises a plurality of microservices 312 that implement or correspond to applications. In some embodiments, an API gateway 326 provides an endpoint for external access to the application that the microservices 312 implement.

Local Control Plane: In an embodiment, architecture 300 comprises a local control plane 302 deployed within the application environment 304 and comprising a controller service 306, a time series database 308, and one or more sidecars 310, with each sidecar process associated with a different microservice 312 hosted in the application environment. In some embodiments, the multi-layer risks engine 180 is owned, operated, and/or controlled by a service provider or other first entity, and the application environment 304 is owned, operated, and/or controlled by a second entity having a customer relationship to the first entity. Therefore, the term "customer" is used herein to illustrate one clear example, but other embodiments do not require a customer, and the application environment 304 could be controlled by the same entity as the multi-layer risks engine 180. The implementation of sidecars 310 in other contexts is described in Anonymous, "Envoy: Envoy documentation," which is available online at the time of this writing in the document tree at: https://www.envoyproxy.io/docs/envoy/v1.24.1/.

In one embodiment, a user or the customer deploys the local control plane 302 using a script that interfaces with the customer's container platform API 314 (e.g., the Kubernetes cluster API) to bring up the components. The controller service 306 and the time series database 308 initialize and execute as application containers running within the application environment 304. A set of executable instructions, a process, or a thread termed sidecar 310 hooks into the network path of a microservice 312 and thus has access to the APIs, and the data flows flowing in and out of the microservice. Traffic 320, 322, 324 represent the APIs and data flows. Establishing programmatic connections or hooks for this purpose is described, for other contexts, in J. Song, "Understanding the Sidecar Injection, Traffic Intercepting & Routing Process in Istio," available online at the time of this writing in the document or folder sidecar-injection-iptables-and-traffic-routing/ of the path /en/blog/ of the Internet domain jimmysong.io.

Microservices 312 within an application environment 304 serve incoming requests through a frontend API gateway layer 326 from external customers, API developer accounts, and devices, as traffic 320 shows. An external request may traverse APIs or other software layers of multiple microservices 312 and third-party API/data layers represented by traffic 322 and 324 before a response is returned to the external clients.

In an embodiment, the local control plane 302 can also call one or more cloud APIs 315 corresponding to external, networked, or cloud-based services to assess metadata and/or obtain other information to enrich the live telemetry 126, as further described in other sections.

In an embodiment, the controller service 306 brings up the sidecars 310 per microservice 312. To do this, the controller service 306 interfaces with the container platform API 314 to derive a list of containers of microservices 312 deployed within a cluster or application environment 304. Using a webhook injection mechanism provided by the container platform APIs 314, the controller service 306 adds the sidecar 310 alongside each application or microservice 312. For the Kubernetes platform, an example injection mechanism is described in Anonymous, Kubernetes: Dynamic Admission Control, which is available online at the time of this writing at https://kubernetes.io/docs/reference/access-authn-authz/extensible-admission-controllers/. Whenever a new microservice 312 is deployed in the application environment 304, the webhook mechanism is used to deploy a new sidecar 310 alongside each new microservice. The controller service 306 goes on to configure the sidecars 310 to look at specific items of live telemetry 126 within APIs of the microservices 312 and data flows such as:

Request source hostname
Request destination hostname
Request destination port
Request source service name (if any)
Request source namespace (if any)
Request destination service name (if any)
Request destination namespace (if any)
Request API endpoint
Request API method (Post, Get, Put, Delete, or others)
Request protocol (HTTP, GRPC, TCP, MySQL, or others)
Request authentication headers (if any)
Response code (if any)
Response Error message (if any)
Response Error status (if any)
Number of requests The particular implementation of a sidecar 310 takes as an input a configuration document provided by the multi-layer risks engine 180 via the controller service 306, in JSON or YAML, specifying the parameters above and configures its telemetry output accordingly. Embodiments can be programmed to further customize the output of the live telemetry 126 specific to application layer protocols implemented by the containers of microservices 312. As an example, an embodiment can be programmed to automatically detect known open ports on containers of microservices 312 and configure the sidecar 310 associated with the container to output telemetry relevant to the protocols associated with the open ports. For example, detecting the use of port "3306," which is a well-known server port for the MySQL database service, could cause configuring the sidecar 310 of a container executing MySQL as the microservice 312 to output live telemetry 126 relevant to the MySQL protocol. The live telemetry 126 can comprise sets of key-value pairs or a list of keys and metrics and can be stored in the time series database 308 as a record, row, or metric tuple.

The controller service 306 is also programmed to configure the sidecars 310 to send metrics to the time series database 308 for the application traffic periodically. For example, the sidecars 310 can be configured to send the live telemetry 126 every 15 seconds. TABLE 1 presents an example of code that can be used for this configuration:

TABLE 1

CONFIGURING SIDECAR TO SEND METRICS

```
apiVersion: install.istio.io/vlalpha1
kind: IstioOperator
spec:
  profile: minimal
  meshConfig:
    defaultConfig:
      extraStatTags:
        - request_method
        - request_urlpath
        - request_authorization
  values:
    telemetry:
      v2:
        19rometheus:
```

TABLE 1-continued

CONFIGURING SIDECAR TO SEND METRICS

```
      configOverride:
        inboundSidecar:
          metrics:
            - name: requests_total
              dimensions:
                request_method: request.method
                request_urlpath: request.url_path
                grpc_response_status: response.grpc_status
                request_authorization:
  request.headers.authorization
            - name: request_duration_milliseconds
              dimensions:
                request_method: request.method
                request_urlpath: request.url_path
                grpc_response_status: response.grpc_status
        outboundSidecar:
          metrics:
            - name: requests_total
              dimensions:
                request_method: request.method
                request_urlpath: request.url_path
                grpc_response_status: response. grpc_status
                request_authorization:
  request.headers.authorization
            - name: request_duration_milliseconds
              dimensions:
                request_method: request.method
                request_urlpath: request.url_path
                grpc_response_status: response.grpc_status
        gateway:
          metrics:
            - name: requests_total
              dimensions:
                request_method: request.method
                request_urlpath: request.url_path
                grpc_response_status: response.grpc_status
                request_authorization:
  request.headers.authorization
            - name: request_duration_milliseconds
              dimensions:
                request_method: request.method
                request_urlpath: request.url_path
                grpc_response_status: response.grpc_status
```

In an embodiment, the controller service 306 is programmed with a control loop that queries the time series database 308 every configurable amount of time to retrieve traffic metrics from stored records of the live telemetry 126, such as requests per second, successful requests/sec, errors/sec, and requests missing security parameters such as required authentication headers or ill-formed API expressions. Using a plurality of queries, the controller service 306 is programmed to help filter the data that the multi-layer risks engine 180 requires, from the time series database 308, to ascertain the interconnections between microservices 312 and their security characteristics. TABLE 2 presents an example query.

TABLE 2

EXAMPLE RETRIEVAL QUERY

```
sum+by+ (source_workload, source_workload_namespace,
destination_service_name, request_protocol, destination_service,
destination_workload, destination_workload_namespace,
request_urlpath, request_method) ( (rate (istio_requests_total
{reporter='source', source_workload_namespace=~'%s'}
[300s]) ) +or+ (rate (istio_tcp_sent_bytes_total {reporter='source',
source_workload_namespace=~'%s'} [300s]) ) +or+ (rate
(istio_requests_total {reporter= 'destination',
destination_workload_namespace=~'%s',
source_workload_namespace='unknown'} [300s]) ) )
```

In an embodiment, the controller service 306 connects with a metadata service via cloud APIs 315 to retrieve additional information about services and applications seen in the live telemetry 126. The specific metadata service called via cloud APIs 315 is specific to the customer environment. In various embodiments, the metadata service could be the Kubernetes cluster API server and could be called via container platform APIs 314 if the customer applications are deployed within a Kubernetes cluster and the cloud provider API for the cloud system in which the customer applications are deployed. The information obtained from the metadata service can include the source and destination namespaces in the case of Kubernetes applications, container names, or virtual machine names. All such data constitutes additional annotations and context that the controller service 306 is programmed to add to the metric tuple in a row or record of time series database 308. For a Kubernetes implementation, the controller service 306 is programmed to query the Kubernetes API server via the container platform APIs 314 for service descriptions of source and destination host names seen in the live telemetry 126. The service descriptions comprise selector key value labels that point to the names of the microservices 312 or containers associated with the microservices in the cluster. Querying the Kubernetes API server for container names specific to the selector labels provides additional metadata about the containers behind the service names.

Additionally, the controller service 306 is programmed to query the metadata service via cloud APIs 315 for data describing configurations specific to the application services, resources, or data services that the microservices 312 communicate with. Example data can comprise security-related configurations, such as whether the data stored in the database accessed by a microservice 312 is encrypted, whether the connection to a data service like the Redis cache 210 is encrypted, a level of openness of the access to a specific data resource based on its network configuration, or others. This information is collected so that the multi-layer risks engine 180 can assess the vulnerabilities or risks in the application environment 304 and determine which application-level interactions could cause critical security breaches.

After collecting the live telemetry 126, configuration data, and metadata for the past control loop period for all microservices 312 running in the application environment 304, the controller service 306 is programmed to create a message with the latest combined data as the payload and to send the message to the SaaS control plane 301. In an embodiment, the SaaS control plane 301 operates as a central control plane that all customer-local controller services, like controller service 306, communicate with to send live telemetry 126 and to fetch security policies and commands that are enforced locally in the customer environment. The SaaS control plane 301 comprises a message queue service 330, a controller service consisting of the middleware connecting frontend and API layers 332 with backend data services, relational database services programmatically coupled to a database 334, stream processing services or stream analytics 336 that perform event-based processing on data sourced from the message queue services, and graph processing services or graph analytics 338 that run graph analytics algorithms on the live telemetry 126 data from customer applications.

In an embodiment, the frontend services and API layers 332 present the runtime application security graph 200 visualizations and graph data outputs, respectively, as they are updated in real-time while interfacing with backend middleware services.

The controller service 306 in the application environment 304 is programmed to send the one or more payloads of the live telemetry 126 to the message queue service 330, which enables the processing of this data in an event-based, asynchronous manner. The asynchronous processing pattern can easily be scaled to hundreds and thousands of application environments 304. A streaming service receives this payload from a queue of the message queue service 330, processes the data, and stores the data in a relational format in the database 334. Frontend APIs and UI services of layers 332 pull this data from middleware APIs in a graph format and present it to end-user computers as the runtime application security graph 200.

Figure 4:
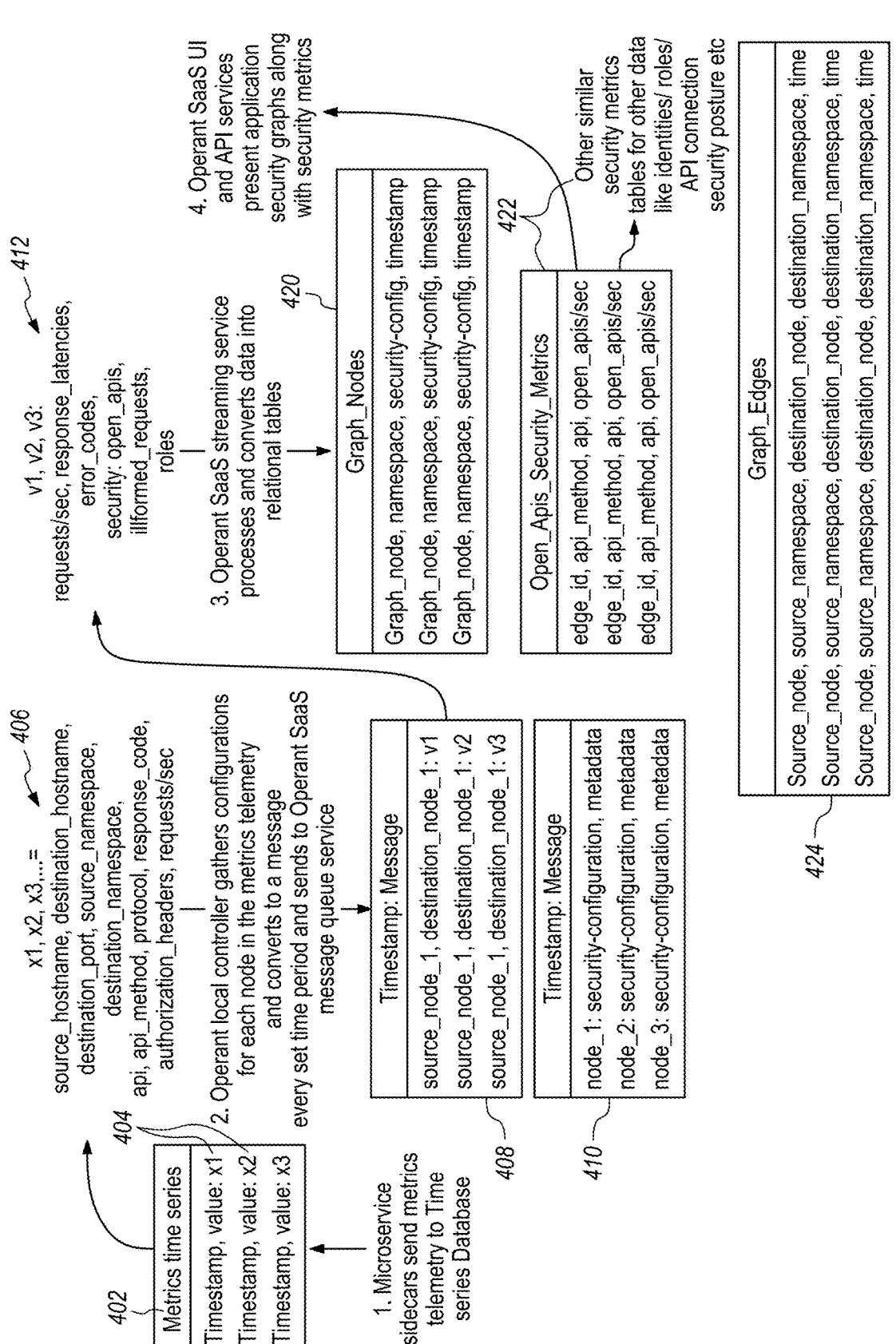
FIG. 4 illustrates examples of algorithms and data transformations that can generate a runtime application security graph in real time using an embodiment.

FIG. 4 illustrates examples of algorithms and data transformations that can generate a runtime application security graph in real time using an embodiment. FIG. 4 and each other flow diagram herein are intended to illustrate the functional level at which skilled persons, in the art to which this disclosure pertains, communicate with one another to describe and implement algorithms using programming. The flow diagrams are not intended to illustrate every instruction, method object, or sub-step that would be needed to program every aspect of a working program but are provided at the same functional level of illustration that is normally used at the high level of skill in this art to communicate the basis of developing working programs.

In an embodiment, the local controller service 306 (FIG. 3) in the application environment 304 configures the sidecars 310 deployed alongside microservices 312 to look at specific details of the live telemetry 126 within API and data traffic and sends them periodically to the time series database 308 deployed in the same environment. The time series database 308 can be programmed using a schema that specifies a different table or row or a particular metrics time series 402. Each metric time series 402 comprises a plurality of metrics tuples 404, each comprising a timestamp, a metric identifier or label, and a value of the metric. The metrics stored in a metrics time series 402 can represent different application request metrics, including security metrics.

In Step 1, block 406, the example of FIG. 4 shows the metric "requests/sec" being added in the time series database, which includes information keys about the source and destination hostnames, ports, API endpoints, request protocols, response codes including error codes and error messages, and requests/sec for a specific API endpoint within the source and destination service pair. Other examples include security metrics such as the number of API requests that are unauthenticated or unauthorized and identities/roles that access APIs and microservice data within the requests.

Each information key within an application metric adds to the cardinality of the data collected, as each potential key-value pair has a unique timestamp. This increasing cardinality could quickly lead to an exponential rise in the collected data or metrics. The local controller service 306 is programmed to manage increasing scale by continuously filtering and aggregating key metrics from the time series database 308 and sending the filtered summary metrics to the SaaS control plane 301 for storage in database 334. The foregoing approach avoids sending all the raw metrics directly to the cloud, reduces the cost of metrics storage in database 334 in the cloud, and reduces the amount of customer data that exits the application environment 304 for privacy and compliance reasons.

In Step 2, a control loop in the local controller service 306 is programmed to continuously query the time series database 308 for specific metrics over a larger period (5 minutes by default but configurable) in the order of a few minutes, aggregating the values and sending the aggregated metrics as message 408 to the message queue service 330 in the cloud. This data payload within message 408 represents a graph data structure of source or destination microservice pairs and the connection attributes for each edge within the graph.

In an embodiment, while aggregating metrics, the control loop process programmatically calls the container metadata and cloud metadata services via container platform APIs 314 and cloud APIs 315 to add additional multi-layer security configurations and metadata about the source and destination microservice nodes in one or more messages 410 that it sends out to the SaaS control plane 301. This multi-layer information for each node in the graph inspects issues like security-related vulnerabilities within containers, and virtual machines that host a microservice 312, gathered from CVE databases like NVD mapped to the microservice container images, and security-related gaps in the data store endpoints that the microservices communicate with, gathered by interfacing with the cloud provider API to collect configuration data about the data storage service that is used by microservices, such as an object store bucket misconfigured as being publicly accessible.

In Step 3, a streaming processor service receives the data 412 of messages 408, 410 from the message queue service 330 and converts the messages 408, 410 into relational data to store in database 334. In some embodiments, the KAFKA system available from APACHE can be used for message queuing via message queue service 330. Asynchronous message processing helps scale out the number of receiving streaming processors easily as more application environments 304 are added to the system. As each application environment 304 is uniquely mapped to a partition within the message queue that message queue service 330 manages, the streaming processors receiving the messages 408, 410 can be horizontally scaled as the number of partitions is scaled proportionally to the application environments 304.

In an embodiment, database 334 is programmed using a schema that implements a relational data model having multiple tables 420, 422, 424. In one embodiment, table 420 is configured to store data for graph nodes, table 424 is configured to store data for graph edges, and a plurality of metrics tables 422 are configured to store edge metrics like requests/sec, errors, and security metrics like unauthorized requests/sec. The metrics tables 422 are linked to the graph tables 420, 424 using foreign keys representing graph node identifiers (IDs) and edge IDs to correlate security configurations and metadata with the graph nodes and edges. All the table rows have a timestamp as a key, as the graph and associated metrics and configurations are stored for a specific timestamp, which gets added over time. In an embodiment, database 334 stores a history of multiple runtime application security graphs 200 in this manner and allows for historical querying of the graph data to understand application interactions and security risks as they evolve over time.

In Step 4, a graphical user interface and API present the runtime application security graph 200 as a visualization and JSON/YAML data, respectively, by reading data from the database 334 through data middleware layers. Various embodiments can implement one or more of the following queries for graph analytics against the application security graph. These are executed as periodic analytics processors that compute queries on graph data over time.

In certain embodiments, the highest criticality attack paths to potential data assets in the deep backend of a customer's application architecture may be otherwise blind spots. In an embodiment, programmed graph analytics ties together the vulnerabilities and security configuration context of different graph nodes that connect and form potential attack paths into a critical data store or cache element. The analytics processor analyzes connected graph paths representing API or data flows that flow into each graph node, collecting the security configuration for each node and comparing it against the best practice configuration of the graph node to determine a risk or security gap value. This computation is done for all nodes along the graph paths leading to a node to determine potential security attack vectors along the security graph for each microservice or data asset.

A potential remediation for a security gap, such as APIs that allow unauthenticated access, is to add proper authentication best practices for all APIs, which would check authentication validity and expiry. The system users can add this sort of remediation by making application code changes to add relevant authentication checks to their APIs or using enforcement capabilities within the system to shut down access for invalid or unauthenticated access. The system's enforcement point within the customer environment is via the microservice sidecar. The system configures the sidecar to stop unauthenticated access in an automated manner without needing application code changes.

Figure 6:
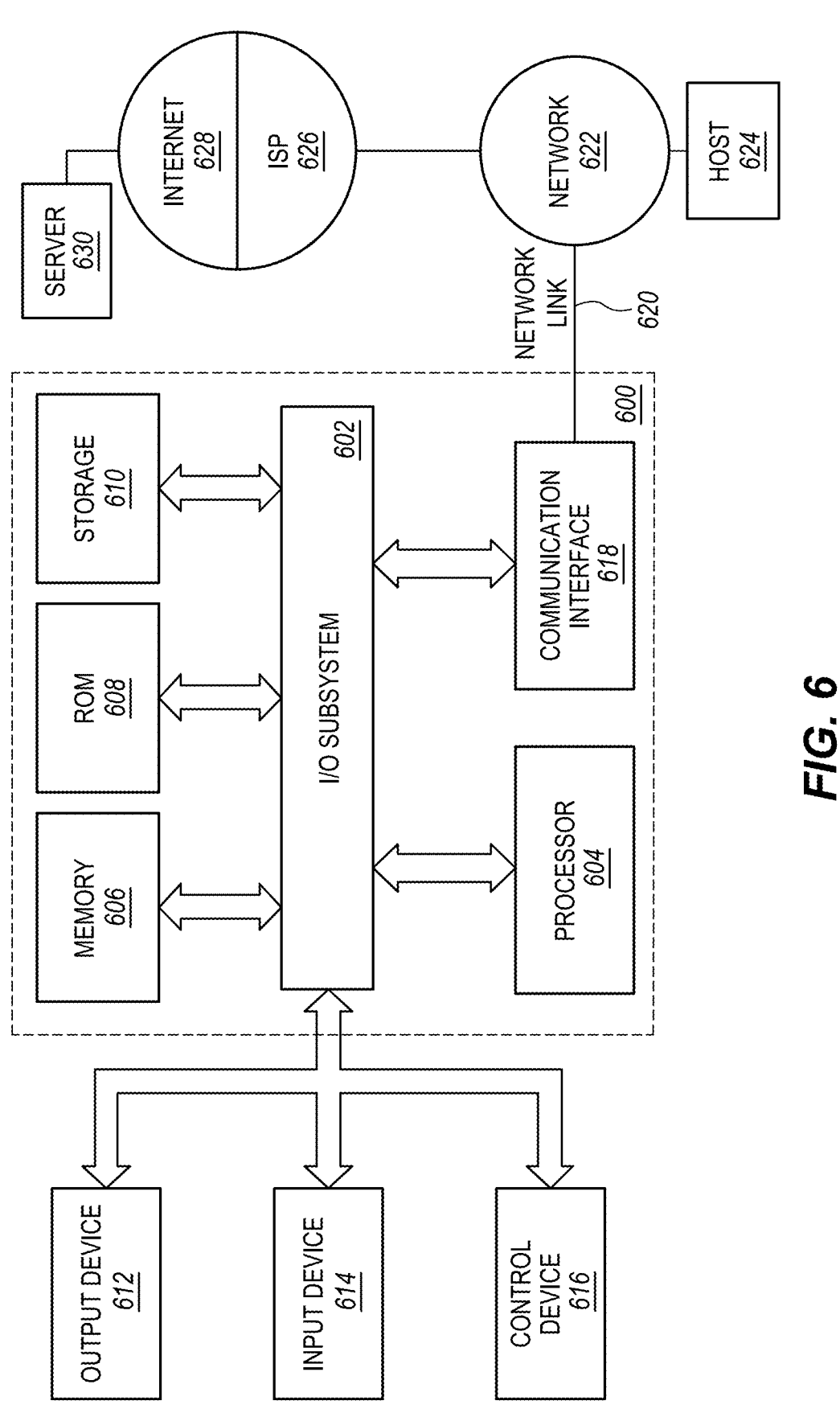
FIG. 6 illustrates a computer system with which one embodiment could be implemented.

In certain embodiments, drift in microservice interactions over time may highlight unknown external connections in real time. As the system stores graphs and associated metrics over time, graph analytics programmed in embodiments continuously try to detect drift in microservices interactions, especially if the microservice is seen talking to unknown external IP addresses or third-party APIs. As seen in FIG. 6, a streaming processor dequeues new messages from the customer environment and determines the drift between destination services seen for each node in the new telemetry vs previously seen services. If there is a drift from previously understood connections, an alert is sent to a security team, alerting them of a drift in microservice behavior.

A potential remediation for such a security event is to assess whether the access is potentially nefarious. Users can help tag such accesses manually as nefarious and shut them down using application code changes or patching the container image to disallow the nefarious access if the access originated from within the container shell via a nefarious actor. Using the system, users can shut down the access by enforcing a policy within the sidecar that disallows outgoing microservice traffic to the relevant IP address and port, hostname, or API URL.

2.3 Risk Categories and Toxic Combination Patterns

As described in connection with FIG. 1, in certain embodiments, the runtime security engine 180 is programmed to utilize predefined rule categories that codify what insecure configuration or behavior to look for to start building a risk profile for applications. As new rules are codified, they become available to monitor across all customer environments. Two or more individual risk categories 130 can correspond to a distinct logical layer that applications or infrastructure use or interact with. In one embodiment, the application layers associated with the risk categories 130 can comprise an identity layer 132, a service layer 138, an API layer 144, a data layer 150, a container layer 156, a process layer 162, and an artificial intelligence or AI layer 168. All data items stored as part of the risk categories 130 and data identifying the layers can be digitally stored in structured, persistent storage, such as in tables of a relational database system, an in-memory graph, or other data structures.

In one embodiment, for the identity layer 132, the rule categories 130 may include over-permissioned identities 134 and over-permissioned roles 136; for the service layer 138, the rule categories may include lateral movement to critical services 140 and over-permissioned services 142; for the API layer 144, the rule categories 130 may include unauthenticated API access 146 and unauthorized API access 148; for the data layer 150, the rule categories may include data exfiltration to untrusted APIs 152 and weak database authorization 154; for the container layer 156, the rule categories may include over-privileged containers 158 and unlimited resources 160; for the process layer 162, the rule categories may include unknown process execution 164 and vulnerable packages 166; for the AI layer 168, the rule categories may include insecure prompts 170 and untrusted AI plugins 172. With this organization, each layer effectively represents different sources of risks to applications, containers, and clusters; the layers express that applications, containers, and clusters can create risk by interacting with artificial intelligence, APIs, identity systems, and various services.

Based on the risk categories, the runtime security engine 180 is programmed to generate combinations of risk profiles across application layers and dependencies that could become toxic. These patterns can be codified and made available for analysis across all user environments. As an example, and not by way of limitation, an example toxic combination that correlates risks across multiple layers to highlight high severity impact may be:

0. A container with a known data exfiltration vulnerability in one of its packages is a critical payments service that has an unauthenticated API exposed and is connected to a database with weak access credentials. Or, a well-known data exfiltration vulnerability is discovered to be present in an application container that is connected to a database with personally identifiable information (PII) data and also has an open API endpoint granting anyone access to the data and the application container, leading to a high risk of data breach or data loss.

1. A toxic combination can be a container with drifted processes and data exfiltration. This toxic combination is across the container, process, and data layers. The initial access vulnerability layer for this toxic combination can be the container layer. In an example scenario, a compromised pod exhibits process drift, indicating malicious activity. An attacker injects code into the pod, collects sensitive data, and exfiltrates it without proper encryption.

2. Another toxic combination can be container software vulnerability with process escalation. This toxic combination is across the container and process layers. The initial access vulnerability layer for this toxic combination can be the container layer. In an example scenario, a container is found to have a software vulnerability that allows an attacker to escalate processes within the container, gaining unauthorized access and potentially compromising the host system.

3. Another toxic combination can be a container software vulnerability allowing host-level file system manipulation. This toxic combination is across the container and data layers. The initial access vulnerability layer for this toxic combination can be the container layer. In an example scenario, a container software vulnerability is exploited by an attacker to manipulate the host-level file system, potentially leading to unauthorized access to critical files and data.

4. Another toxic combination can be a container software vulnerability allowing arbitrary process execution. This toxic combination is across the container and process layers. The initial access vulnerability layer for this toxic combination can be the container layer. In an example scenario, a container is vulnerable to arbitrary process execution. An attacker exploits this vulnerability to execute malicious processes within the container, compromising the integrity of the containerized application.

5. Another toxic combination can be a container software vulnerability allowing host-level process manipulation. This toxic combination is across the container and process layers. The initial access vulnerability layer for this toxic combination can be the container layer. In an example scenario, a container software vulnerability is leveraged by an attacker to manipulate host-level processes, leading to unauthorized control over the host system.

6. Another toxic combination can be container vulnerability exploited for network egress attacks. This toxic combination is across the container and data layers. The initial access vulnerability layer for this toxic combination can be the container layer. In an example scenario, an attacker exploits a vulnerability in a container for network egress attacks, enabling the unauthorized transfer of data from the container to external locations.

7. Another toxic combination can be a container software vulnerability and role with excessive permissions. This toxic combination is across the container and identity layers. The initial access vulnerability layer for this toxic combination can be the container layer. In an example scenario, a container software vulnerability is combined with a misconfigured role, granting excessive permissions. This toxic combination allows attackers to compromise the container and abuse the associated privileges.

8. Another toxic combination can be a container software vulnerability enabling unrestricted process resource usage. This toxic combination is across the container and process layers. The initial access vulnerability layer for this toxic combination can be the container layer. In an example scenario, a container software vulnerability allows unrestricted usage of process resources. An attacker exploits this vulnerability to consume excessive resources within the container, potentially leading to service disruptions.

9. Another toxic combination can be misconfigured role binding with pod privileges. This toxic combination is across the identify and service layers. The initial access vulnerability layer for this toxic combination can be the identity layer. In an example scenario, a misconfigured role binding grants excessive privileges to a service account. An attacker exploits this misconfiguration to escalate privileges, evade detection, and potentially disrupt the cluster.

10. Another toxic combination can be a pod with misconfigured role binding and exposed secrets. This toxic combination is across the identity and data layers. The initial access vulnerability layer for this toxic combination can be the identity layer. In an example scenario, a pod has a misconfigured role binding, granting unauthorized access to an identity. Attackers exploit this misconfiguration to access sensitive secrets stored within the pod, potentially leading to data exposure.

11. Another toxic combination can be an overly permissive role binding with a lack of authentication identity.

This toxic combination is across the identity and data layers. The initial access vulnerability layer for this toxic combination can be the identity layer. In an example scenario, a Kubernetes role binding grants overly permissive access to an identity without proper authentication measures. Attackers exploit this weakness to gain initial access to the cluster.

12. Another toxic combination can be an exposed API with insecure authentication. This toxic combination is across the API and data layers. The initial access vulnerability layer for this toxic combination can be the API layer. In an example scenario, an API in the Kubernetes cluster is exposed without proper authentication mechanisms. Attackers gain initial access, exploit broken authentication, and perform impactful actions on the exposed API.

13. Another toxic combination can be an unsecured API gateway with injection vulnerability. This toxic combination is across the API and data layers. The initial access vulnerability layer for this toxic combination can be the API layer. In an example scenario, an API gateway in the Kubernetes environment lacks proper security controls. An attacker exploits an injection vulnerability in the API gateway, gaining initial access and executing arbitrary code within the cluster.

14. Another toxic combination can be an exposed API with missing rate limiting. This toxic combination is across the API and container layers. The initial access vulnerability layer for this toxic combination can be the API layer. In an example scenario, an API exposed to the internet lacks rate-limiting controls. Attackers exploit this weakness to perform impactful actions, potentially causing denial-of-service or resource exhaustion.

15. Another toxic combination can be an insecure API communication with a lack of encryption. This toxic combination occurs across the API and data layers. The initial access vulnerability layer for this toxic combination can be the API layer. In an example scenario, API communication within the Kubernetes cluster lacks encryption. An attacker intercepts and collects sensitive data exchanged between APIs due to missing or improper encryption.

16. Another toxic combination can be an exposed API with unauthorized access to sensitive data. This toxic combination is across the API and data layers. The initial access vulnerability layer for this toxic combination can be the API layer. In an example scenario, an API containing sensitive data is exposed without proper authentication. Attackers gain unauthorized access, collect sensitive information, and potentially cause impactful actions within the cluster.

17. Another toxic combination can be an API security misconfiguration with privilege escalation. This toxic combination is across the API and container layers. The initial access vulnerability layer for this toxic combination can be the API layer. In an example scenario, misconfigurations in API security settings lead to privilege escalation. Attackers exploit these misconfigurations to escalate privileges and evade detection within the Kubernetes environment.

18. Another toxic combination can be an exposed API with injection leading to data manipulation. This toxic combination is across the API and data layers. The initial access vulnerability layer for this toxic combination can be the API layer. In an example scenario, an API exposed to external entities is susceptible to injection attacks. Attackers inject malicious code, causing data manipulation and impacting the integrity of information stored in the cluster.

19. Another toxic combination can be an exposed API with a privilege escalation path. This toxic combination is across the API and container layers. The initial access vulnerability layer for this toxic combination can be the API layer. In an example scenario, an exposed API provides a pathway for privilege escalation. Attackers leverage this pathway to escalate privileges within the Kubernetes environment.

20. Another toxic combination can be an exposed API with unauthenticated access to sensitive endpoints. This toxic combination is across the API and data layers. The initial access vulnerability layer for this toxic combination can be the API layer. In an example scenario, an API is exposed without proper authentication controls, allowing unauthenticated access to sensitive endpoints. Attackers exploit this vulnerability to gain unauthorized access and potentially compromise sensitive data.

21. Another toxic combination can be an exposed API with injection leading to unauthorized token creation. This toxic combination is across the API and AI layers. The initial access vulnerability layer for this toxic combination can be the API layer. In an example scenario, an API exposed to external entities is vulnerable to injection attacks. Attackers inject malicious code, leading to the unauthorized creation of tokens and potential abuse of RBAC mechanisms.

22. Another toxic combination can be an insecure API gateway with ephemeral container injection. This toxic combination is across the API and container layers. The initial access vulnerability layer for this toxic combination can be the API layer. In an example scenario, an insecurely configured API gateway allows attackers to inject ephemeral containers. These containers evade detection and execute arbitrary code, potentially disrupting the Kubernetes environment.

In an embodiment, the runtime security engine 180 is programmed to combine the data streams described above to generate a customized set of toxic combinations specific to the application environment. The data streams may include the live telemetry 126 and behavior across multiple layers of the stack, as well as the risk rules and toxic combination patterns. The live telemetry 126 may be sent from the cluster by a locally running controller like controller service 306 (FIG. 3) to the runtime security engine 180 periodically. The runtime security engine 180 is programmed to evaluate the live telemetry 126 per cluster or application environment 304 against the risk rules and toxic combination patterns using a rule processor per risk rule. The runtime security engine 180 is programmed to store the matched results in database 334 in a table of detected risks. This is done periodically while storing historical results over time. In summary, the telemetry and metadata of applications collected across the container vulnerabilities, identities, and network, API layers along with the graph context of where the service is located (FIG. 1) together can help the runtime engine compute the toxic combinations highlighted above.

2.4 Adaptive Feedback-Based Tuning of Toxic Combinations

Based on how security teams prioritize and react to the toxic combinations, the runtime security engine 180 can be programmed to learn from the user behavior and start tuning how toxic combinations are computed for a specific user account, identity, or computer. An example of tuning risk insights for a specific user account, identity, or computer is as follows. In one embodiment, based on user preferences, when a security team labels certain services as critical, such as the ones that process payment data, the runtime security engine will start increasing the criticality of the risk metrics tied to the toxic combinations for those critical services. This will, in turn, prioritize the combinations that include those critical services. In another embodiment, the runtime security engine may automatically detect from the live telemetry if a service is public-facing, meaning it serves APIs directly to public clients or communicates with external third-party APIs on the egress side. Based on the detected features, the runtime security engine may deem the criticality of certain toxic combinations of risks higher for these services versus the internal ones, as there is a higher risk of vulnerabilities getting exploited in these public-facing services.

The runtime security engine may also tune the catalog of toxic combination patterns with learnings that can be applied more broadly to other users' application environments. An example could be a specific high-severity vulnerability such as Log 4j with a known exploit but which is also deployed within application environments in insecure ways, such as having excessive privileges or being able to access external networks in an unrestricted/unaudited manner, which would increase overall security risk. In an example embodiment, the runtime security engine may check a tuple with a format like [Container-name, application-name, presence of Critical CVE such as Log 4j CVE, external APIs called: External IP addresses/services+Request URL]. There could be multiple such tuples across different container services. The set of external IP addresses or service endpoints may be common across attacks on multiple different customer environments. The runtime security engine may create a toxic combination risk type that evaluates this tuple against the external API traffic across environments, which is how just one risk type can generally and automatically apply to all customer environments. Learning this risky pattern in one environment could translate to other environments in an automated manner, reducing the overall time to detect and mitigate risk by orders of magnitude.

FIG. 5 illustrates an example process flow of a programmable method to generate toxic combinations of security risks customized to application environments using an embodiment. FIG. 5 and each other flow diagram herein are intended to illustrate the functional level at which skilled persons, in the art to which this disclosure pertains, communicate with one another to describe and implement algorithms using programming. The flow diagrams are not intended to illustrate every instruction, method object, or sub-step that would be needed to program every aspect of a working program but are provided at the same functional level of illustration that is normally used at the high level of skill in this art to communicate the basis of developing working programs.

In an embodiment, process 500 initiates at step 502, in which a security engine is programmed, using a local controller service deployed within the computing environment, to obtain telemetry data from Kubernetes clusters and applications executing in the computing environment, the telemetry data comprising security-related data. For example, the runtime security engine 180 of FIG. 3 is programmed to use controller service 306 to obtain telemetry data via sidecars 310 from multiple microservices 312 of application environment 304. Sidecars 310 are configured to observe traffic 320 from external identities to the microservices 312 and toward external data stores or third-party APIs like traffic 322, 324. The telemetry data obtained in real-time via the sidecars 310 can inherently contain security-related data, depending on the nature of the traffic, or can be enriched via calls to cloud APIs 315 or container platform APIs 314 to add security-related data.

At step 504, the security engine may be programmed to receive the telemetry data. For example, the controller service 306 can be programmed to programmatically transfer or send messages via streaming message queues of message queue service 330 330 to stream analytics 336 and graph analytics 338 of the SaaS control plane 301.

At step 506, the security engine may access sample rule-based risk categories across multiple application layers, the risk categories codifying insecure behavior across multiple layers. For example, stream analytics 336 can be programmed to access digitally stored risk categories 130 (FIG. 1) from database 334.

At step 508, the security engine may access toxic combination patterns across the multiple layers, the toxic combination patterns being generated based on the risk categories, and each of the toxic combination patterns indicating a high-severity security impact in case of an attack in the computing environment. For example, stream analytics 336 can be programmed to access digitally stored definitions of toxic combination patterns, as described in a preceding section from database 334. In an embodiment, each toxic combination pattern has a unique identifier and is digitally stored in the database 334 with a pattern definition.

At step 510, the security engine may, using a risk processor per risk category, evaluate the telemetry data per cluster or application against the risk categories and toxic combination patterns to find matches between the telemetry data per cluster or application and the risk categories and toxic combination patterns. At step 512, the security engine may generate toxic combinations of security risks customized to the application environments based on the matches. In an embodiment, stream analytics 336 is programmed to combine security-related data, live telemetry, rules, categories, and definitions of toxic combination patterns, as described in other sections herein, to determine whether the security-related data of the live telemetry received from the microservices 312 corresponds to or matches a particular toxic combination pattern.

At step 514, the security engine may store the matched results in a database as risk detections. For example, stream analytics 336 can be programmed to update a table or records in database 334 to specify that risks have been detected. Data stored at step 514 can comprise a record that associates identifiers of microservices that provided telemetry, message identifiers for messages that were dequeued from the streaming queues as a basis of detecting risks, the metrics carried in the messages, a timestamp, a risk category from among the risk categories 130, and an identifier of a toxic combination pattern.

At step 516, the security engine may learn the preferences of user accounts, identities, or computers based on prioritizations and reactions to the toxic combinations of security risks. Techniques for identifying, storing, and machine learning preferences of particular user accounts have been described in other sections.

At step 518, the security engine may determine whether the learned user behavior necessitates tuning the toxic combinations of security risks. If step 518 is FALSE or NO or the functional equivalent, control transfers to step 520, at which the process 500 may end. If step 518 is TRUE or YES or a functional equivalent, then at step 522, the security engine may tune the risk categories across the multiple application layers.

At step 524, the security engine may tune the toxic combinations of security risks based on the tuned risk categories across the multiple application layers. Control then transfers to step 514, which is processed as described above.

3. Implementation Example—Hardware Overview

According to one embodiment, the techniques described herein are implemented by at least one computing device. The techniques may be implemented in whole or in part using a combination of at least one server computer and/or other computing devices coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 6 is a block diagram that illustrates an example computer system with which an embodiment may be implemented. In the example of FIG. 6, a computer system 600 and instructions for implementing the disclosed technologies in hardware, software, or a combination of hardware and software are represented schematically, for example, as boxes and circles, at the same level of detail that is commonly used by persons of ordinary skill in the art to which this disclosure pertains for communicating about computer architecture and computer systems implementations.

Computer system 600 includes an input/output (I/O) subsystem 602, which may include a bus and/or other communication mechanisms for communicating information and/or instructions between the components of the computer system 600 over electronic signal paths. The I/O subsystem 602 may include an I/O controller, a memory controller, and at least one I/O port. The electronic signal paths are represented schematically in the drawings, for example, as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system, a graphics processing unit (GPU), a digital signal processor, or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory, such as various forms of random-access memory (RAM) or another dynamic storage device. Memory 606 may also be used to store temporary variables or other intermediate information during the execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read-only memory (ROM) 608 or other static storage devices coupled to I/O subsystem 602 for storing information and instructions for processor 604. The ROM 608 may include various forms of programmable ROM (PROM), such as erasable PROM (EPROM) or electrically erasable PROM (EEPROM). A unit of persistent storage 610 may include various forms of non-volatile RAM (NVRAM), such as FLASH memory, solid-state storage, magnetic disk, or optical disks such as CD-ROM or DVD-ROM and may be coupled to I/O subsystem 602 for storing information and instructions. Storage 610 is an example of a non-transitory computer-readable medium that may be used to store instructions and data, which, when executed by processor 604, causes performing computer-implemented methods to execute the techniques herein.

The instructions in memory 606, ROM 608, or storage 610 may comprise one or more sets of instructions that are organized as modules, methods, objects, functions, routines, or calls. The instructions may be organized into one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation layer, application layer, and data storage layer, such as a relational database system using a structured query language (SQL) or no SQL, an object store, a graph database, a flat-file system, or other data storage.

Computer system 600 may be coupled via I/O subsystem 602 to at least one output device 612. In one embodiment, output device 612 is a digital computer display. Examples of a display that may be used in various embodiments include a touchscreen display, a light-emitting diode (LED) display, a liquid crystal display (LCD), or an e-paper display. Computer system 600 may include another type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators, or servos.

At least one input device 614 is coupled to I/O subsystem 602 for communicating signals, data, command selections, or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on an output device 612 such as a display. The input device may have at least two degrees of freedom in two axes, a first axis (for example, x) and a second axis (for example, y), that allows the device to specify positions in a plane. Another type of input device is a wired, wireless, or optical control device, such as a joystick, wand, console, steering wheel, pedal, gearshift mechanism, or another type of control device. An input device 614 may include a combination of multiple different input devices, such as a video camera and a depth sensor.

In another embodiment, computer system 600 may comprise an Internet of Things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders, and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware, and interfaces for generating position reporting packets, notifications, pulse or heartbeat signals, or other recurring data transmissions that specify a position of the computer system 600, alone or in combination with other application-specific data, directed toward host computer 624 or server computer 630.

Computer system 600 may implement the techniques described herein using customized hard-wired logic, at least one ASIC or FPGA, firmware, and/or program instructions or logic which, when loaded and used or executed in combination with the computer system, causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media," as used herein, refers to any non-transitory media that store data and/or instructions that cause a machine to operate in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid-state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wires, and fiber optics, including the wires that comprise a bus of I/O subsystem 602. Transmission media can also be acoustic or light waves, such as those generated during radio-wave and infrared data communications.

Various forms of media may carry at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal, and appropriate circuitry can provide the data to I/O subsystem 602 and place the data on a bus. I/O subsystem 602 carries the data to memory 606, from which processor 604 retrieves and executes the instructions. The instructions received by memory 606 may optionally be stored on storage 610 before or after execution by processor 604.

Computer system 600 also includes a communication interface 618 coupled to I/O subsystem 602. Communication interface 618 provides a two-way data communication coupling to a network link(s) 620 directly or indirectly connected to at least one communication network, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 622 broadly represents a local area network (LAN), wide-area network (WAN), campus network, internetwork, or any combination thereof. Communication interface 618 may comprise a LAN card to provide a data communication connection to a compatible LAN or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic, or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may connect through network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a worldwide packet data communication network called Internet 628. A server computer 630 may be coupled to Internet 628. Server computer 630 broadly represents any computer, data center, virtual machine, or virtual computing instance with or without a hypervisor or computer executing a containerized program system such as DOCKER or KUBERNETES. Server computer 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server computer 630 may form elements of a distributed computing system that includes other computers, a processing cluster, a server farm, or other organization of computers that cooperate to perform tasks or execute applications or services. Server computer 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 630 may comprise a web application server that hosts a presentation layer, application layer, and data storage layer, such as a relational database system using a structured query language (SQL) or no SQL, an object store, a graph database, a flat-file system or other data storage.

Computer system 600 can send messages and receive data and instructions, including program code, through the network(s), network link 620, and communication interface 618. In the Internet example, a server computer 630 might transmit a requested code for an application program through Internet 628, ISP 626, local network 622, and communication interface 618. The received code may be executed by processor 604 as it is received and/or stored in storage 610 or other non-volatile storage for later execution.

The execution of instructions, as described in this section, may implement a process in the form of an instance of a computer program that is being executed and consisting of program code and its current activity. Depending on the operating system (OS), a process may comprise multiple threads of execution that execute instructions concurrently. In this context, a computer program is a passive collection of instructions, while a process may execute those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations when a task indicates that it can be switched or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims issued from this application in the specific form in which such claims issue, including any subsequent correction.

What is claimed is:

1. One or more non-transitory computer-readable media storing one or more sequences of instructions which, when executed using one or more processors, cause the one or more processors to execute, using a runtime security engine deployed within a computing environment:

obtaining, from a local controller service deployed within the computing environment, telemetry data from microservices executing in the computing environment, and the telemetry data comprising security-related data;

accessing a plurality of risk categories codifying insecure behavior across a plurality of layers in the computing environment;

accessing a plurality of toxic combination patterns across the plurality of layers, the plurality of toxic combination patterns being generated based on the plurality of risk categories, and each of the toxic combination pattern indicating a high-severity security impact in case of an attack in the computing environment;

evaluating the telemetry data against the plurality of risk categories and the plurality of toxic combination patterns, the evaluating producing a customized set of toxic combination patterns specific to the microservices within the computing environment; and displaying the customized set of toxic combination patterns in real time in a graphical user interface of a computer display device.

2. The one or more computer-readable media of claim 1, wherein the plurality of layers comprises a service layer, wherein the plurality of risk categories for the service layer comprises one or more of: lateral movement to critical services or over-permissioned services.

3. The one or more computer-readable media of claim 1, wherein the plurality of layers comprises an application programming interface (API) layer, wherein the plurality of risk categories for the API layer comprises one or more of: unauthenticated API access or unauthorized API access.

4. The one or more computer-readable media of claim 1, wherein the plurality of layers comprises a data layer, wherein the plurality of risk categories for the data layer comprises one or more of: data exfiltration to untrusted application programming interfaces (APIs) or weak database authorization.

5. The one or more computer-readable media of claim 1, wherein the plurality of layers comprises a container layer, wherein the plurality of risk categories for the container layer comprise one or more of: over-privileged containers or unlimited resources.

6. The one or more computer-readable media of claim 1, wherein the plurality of layers comprise a process layer, wherein the plurality of risk categories for the process layer comprises one or more of: unknown process execution or vulnerable packages.

7. The one or more computer-readable media of claim 1, wherein the plurality of layers comprise an artificial intelligence (AI) layer, wherein the plurality of risk categories for the AI layer comprises one or more of: insecure prompts or untrusted AI plugins.

8. The one or more computer-readable media of claim 1, wherein each of the toxic combination patterns correlates two or more risk categories across two or more layers of the plurality of layers.

9. The one or more computer-readable media of claim 1, further comprising sequence of instructions which when executed by the one or more processors cause:

using a rule processor, comparing the telemetry data with each of the risk categories and each of the toxic combination patterns, the comparing producing one or more matched results, and storing the one or more matched results in a database as risk detections.

10. The one or more computer-readable media of claim 1, wherein evaluating the telemetry data against the plurality of risk categories and the plurality of toxic combination patterns is based on a set frequency.

11. The one or more computer-readable media of claim 1, further comprising sequence of instructions which when executed by the one or more processors cause:

determining user preferences on prioritizing one or more toxic combination patterns of the customized set of toxic combination patterns;

updating one or more risk categories of the plurality of risk categories based on preference data corresponding to previously received input signals specifying the preferences; and updating the customized set of toxic combination patterns based on the preference data.

12. The one or more computer-readable media of claim 1, further comprising sequence of instructions which when executed by the one or more processors cause:

detecting, based on the telemetry data, one or more risk features associated with an application associated with the microservices;

updating one or more risk categories of the plurality of risk categories based on the one or more risk features; and updating the customized set of toxic combination patterns based on the one or more risk features.

13. The one or more computer-readable media of claim 1, wherein the telemetry data includes at least one of: a request source namespace, a request destination namespace, a request application programming interface (API) endpoint, a request API method, a request authentication header, or identifying information about entities accessing any one of the microservices.

14. The one or more computer-readable media of claim 1, wherein the security-related data includes at least one of: a number of application programming interface (API) requests that are unauthenticated, security-related vulnerabilities within containers and virtual machines hosting the microservices, or security-related gaps in data storage with which the microservices interact.

15. The one or more computer-readable media of claim 1, wherein the local controller service comprises a plurality of sidecar processes, each sidecar process among the plurality of sidecar processes being generated for and corresponding to each microservice among the microservices; wherein each sidecar process among the plurality of sidecar processes is configured to have access to data flowing in and out of a corresponding microservice of the microservices.

16. The one or more computer-readable media of claim 1, wherein the local controller service comprising an application container that a container platform application programming interface (API) brings up in the computing environment, wherein the local controller service is further configured to query a metadata service of the container platform API to obtain additional security-related data including:

whether data stored in a database accessed by a microservice is encrypted;

whether a connection to a data service is encrypted; and how open is an access to a specific data resource based on its network configuration.

17. The one or more computer-readable media of claim 1, wherein the local controller service is programmed to automatically detect an open port of a microservice from the microservices, and output associated telemetry data based on a protocol associated with the open port.

18. A computer system, comprising:

one or more central processing units;

one or more network interfaces that are configured to communicatively couple the one or more central processing units to a data communication network; and electronic digital random-access memory storing one or more sequences of stored program instructions configured for managing security of an application and which, when executed using the one or more central processing units, cause the one or more central processing units to execute, use a runtime security engine deployed within a computing environment:

obtaining, from a local controller service deployed within the computing environment, telemetry data from microservices executing in the computing environment, and the telemetry data comprising security-related data;

accessing a plurality of risk categories codifying insecure behavior across a plurality of layers in the computing environment;

accessing a plurality of toxic combination patterns across the plurality of layers, the plurality of toxic combination patterns being generated based on the plurality of risk categories, and each of the toxic combination pattern indicating a high-severity security impact in case of an attack in the computing environment;

evaluating the telemetry data against the plurality of risk categories and the plurality of toxic combination patterns, the evaluating producing a customized set of toxic combination patterns specific to the application within the computing environment; and displaying the customized set of toxic combination patterns in real time in a graphical user interface of a computer display device.

19. The computer system of claim 18, wherein the plurality of layers comprises a service layer, wherein the plurality of risk categories for the service layer comprises one or more of: lateral movement to critical services or over-permissioned services.

20. The computer system of claim 18, wherein the plurality of layers comprises an application programming interface (API) layer, wherein the plurality of risk categories for the API layer comprises one or more of: unauthenticated API access or unauthorized API access.

21. The computer system of claim 18, wherein the plurality of layers comprises a data layer, wherein the plurality of risk categories for the data layer comprises one or more of: data exfiltration to untrusted application programming interfaces (APIs) or weak database authorization.

22. The computer system of claim 18, wherein the plurality of layers comprises a container layer, wherein the plurality of risk categories for the container layer comprise one or more of: over-privileged containers or unlimited resources.

23. The computer system of claim 18, wherein the plurality of layers comprise a process layer, wherein the plurality of risk categories for the process layer comprises one or more of: unknown process execution or vulnerable packages.

24. The computer system of claim 18, wherein the plurality of layers comprise an artificial intelligence (AI) layer, wherein the plurality of risk categories for the AI layer comprises one or more of: insecure prompts or untrusted AI plugins.

25. The computer system of claim 18, wherein each of the toxic combination patterns correlates two or more risk categories across two or more layers of the plurality of layers.

26. The computer system of claim 18, further comprising sequences of instructions which, when executed using the one or more central processing units, cause the one or more central processing units to execute:

using a rule processor, comparing the telemetry data with each of the risk categories and each of the toxic combination patterns, the comparing producing one or more matched results, and storing the one or more matched results in a database as risk detections.

27. The computer system of claim 18, wherein evaluating the telemetry data against the plurality of risk categories and the plurality of toxic combination patterns is based on a set frequency.

28. The computer system of claim 18, further comprising sequences of instructions which, when executed using the one or more central processing units, cause the one or more central processing units to execute:

determining user preferences on prioritizing one or more toxic combination patterns of the customized set of toxic combination patterns;

updating one or more risk categories of the plurality of risk categories based on preference data corresponding to previously received input signals specifying the preferences; and updating the customized set of toxic combination patterns based on the preference data.

29. The computer system of claim 18, further comprising sequences of instructions which, when executed using the one or more central processing units, cause the one or more central processing units to execute:

detecting, based on the telemetry data, one or more risk features associated with an application associated with the microservices;

updating one or more risk categories of the plurality of risk categories based on the one or more risk features; and updating the customized set of toxic combination patterns based on the one or more risk features.

30. The computer system of claim 18, wherein the telemetry data includes at least one of: a request source namespace, a request destination namespace, a request application programming interface (API) endpoint, a request API method, a request authentication header, or identifying information about entities accessing any one of the microservices.

31. The computer system of claim 18, wherein the security-related data includes at least one of: a number of application programming interface (API) requests that are unauthenticated, security-related vulnerabilities within containers and virtual machines hosting the microservices, or security-related gaps in data storage with which the microservices interact.

32. The computer system of claim 18, wherein the local controller service comprises a plurality of sidecar processes, each sidecar process among the plurality of sidecar processes being generated for and corresponding to each microservice among the microservices; wherein each sidecar process among the plurality of sidecar processes is configured to have access to data flowing in and out of a corresponding microservice of the microservices.

33. The computer system of claim 18, wherein the local controller service comprising an application container that a container platform application programming interface (API) brings up in the computing environment, wherein the local controller service is further configured to query a metadata service of the container platform API to obtain additional security-related data including:

whether data stored in a database accessed by a microservice is encrypted;

whether a connection to a data service is encrypted; and how open is an access to a specific data resource based on its network configuration.

34. The computer system of claim 18, wherein the local controller service is programmed to automatically detect an open port of a microservice from the microservices, and output associated telemetry data based on a protocol associated with the open port.

* * * * *